United States Patent [19]

Aizawa et al.

[11] 4,221,476
[45] Sep. 9, 1980

[54] EXPOSURE ADJUSTING DEVICE FOR CAMERA

[75] Inventors: Hiroshi Aizawa, Kawasaki; Masanori Uchidoi; Susumu Kozuki, both of Kanagawa; Nobuaki Date, Kawasaki; Masami Shimizu, Tokyo; Yoshiyuki Takishima, Kanagawa, all of Japan

[73] Assignee: Canon Kabushiki Kaisha, Tokyo, Japan

[21] Appl. No.: 858,084

[22] Filed: Dec. 6, 1977

[30] Foreign Application Priority Data

Dec. 10, 1976 [JP] Japan ............................... 51-148441
Dec. 24, 1976 [JP] Japan ............................... 51-155996

[51] Int. Cl.² .................. G03B 7/08; G03B 1/18; G03B 15/05
[52] U.S. Cl. .................................... 354/38; 354/173; 354/149; 354/289

[58] Field of Search ................... 354/38, 50, 51, 60 L, 354/60 R, 173, 266, 267, 289, 295, 43, 44, 75, 76, 64, 131, 32, 36, 60 F, 139, 149; 352/141

[56] References Cited

U.S. PATENT DOCUMENTS

| 3,883,883 | 5/1975 | Sano et al. ............................. 354/75 |
| 4,015,198 | 3/1977 | Iwashita et al. ................. 354/173 X |
| 4,079,392 | 3/1978 | Orban ................................... 354/50 |

Primary Examiner—L. T. Hix
Assistant Examiner—William B. Perkey
Attorney, Agent, or Firm—Toren, McGeady and Stanger

[57] ABSTRACT

In the camera disclosed, a light measuring device and input data setting device establish exposure control signals which regulate exposure elements. When the control signal is out of range of an element, a switch turns on an adjusting arrangement which resets the setting device. The setting device may preset an element such as the aperture or shutter.

12 Claims, 15 Drawing Figures

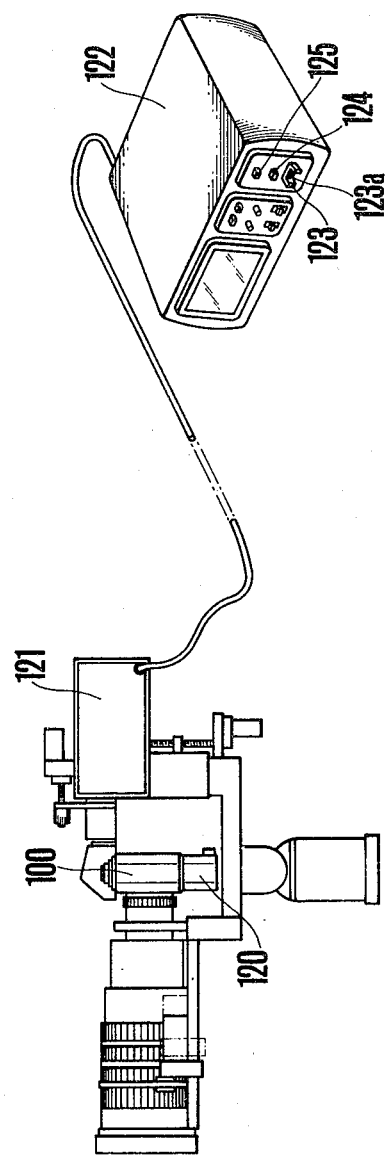

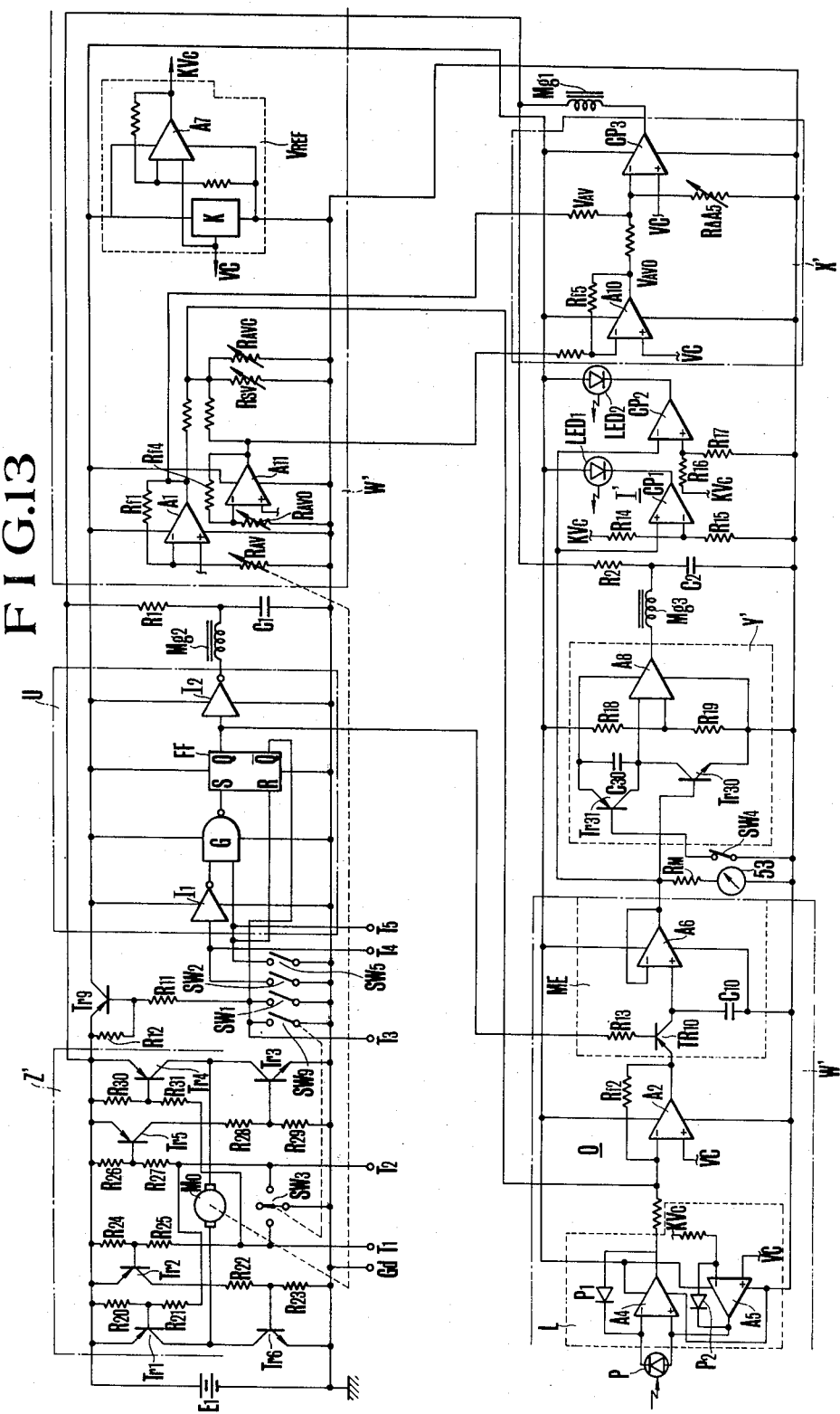
F I G. 13

EXPOSURE ADJUSTING DEVICE FOR CAMERA

BACKGROUND OF THE INVENTION

1. Field of the Invention

This invention relates to an exposure adjusting device for a camera which enables first priority photographic information to be automatically adjusted.

2. Description of the Prior Art

Conventionally, in automatic exposure control apparatus for cameras, there is a shutter priority method and a diaphragm priority method for automatically setting a proper film exposure. Usually a desired shutter time or diaphragm value first is set by operating a shutter dial or diaphragm setting ring. Subsequently, a light measuring switch is turned on in order to perform a light measuring computation so that the operator will know the diaphragm value of shutter time as a function of the computed exposure value which corresponds to the object brightness. A release operation then may be performed establishing an exposure control that is based on the computed exposure value. With the light measuring switch turned on, when the first shutter time setting or diaphragm value setting is wrong with respect to the object brightness, in other words, when the computed exposure value is out of an exposure response range, or when the computed exposure value is outside of what was intended by the photographer, it is necessary to re-adjust the shutter time or diaphragm value. Therefore, the shutter dial or diaphragm setting ring is operated again in order to change the exposure value to a value that is desired or that is within the response range of the computed exposure value. After that, the release operation may be performed.

Such conventional setting and resetting of the shutter dial or the diaphragm setting ring is not only troublesome but also is time-consuming. Consequently, good shutter opportunities are missed and picture framing determination in the exposure operation is hindered. The setting and resetting operations of the shutter dial or diaphragm setting ring are particularly troublesome in motor driven photography, in which a motor drive unit is attached to a camera and in which the shutter button is located on the grip. In remote control photography, the resetting operation is particularly troublesome. Some photographic situations may be encountered, for example, in which the shutter dial or diaphragm ring simply canot be reset.

It is an object of the present invention to eliminate these drawbacks.

Another object of the present invention is to make it possible to reset photographic information.

Still another object of the present invention is to make it possible to set and reset photographic information easily, even in motor drive photography and in remote control photography.

A further object of the present invention is to make it possible to change the set shutter time to a flash exposure time when flash photography is rendered operative.

SUMMARY OF THE INVENTION

To achieve these and other objects of the invention, the priority photographic information that is set first is made automatically adjustable through an adjusting means. This adjusting means is actuated through a one-touch manipulation of a switching means. Thus, the setting and resetting of the photographic information that is first set in priority can be performed with ease.

Means also are provided for displaying the fact that the computed exposure value is beyond the exposure response range and by taking this display means indication into account.

BRIEF DESCRIPTION OF THE DRAWINGS

FIG. 8 is a view showing the appearance of a remote control device for FIG. 7;

FIG. 13 is a diagram of an exposure control circuit for the camera shown in FIG. 11;

DESCRIPTION OF THE PREFERRED EMBODIMENTS

Figure 1:
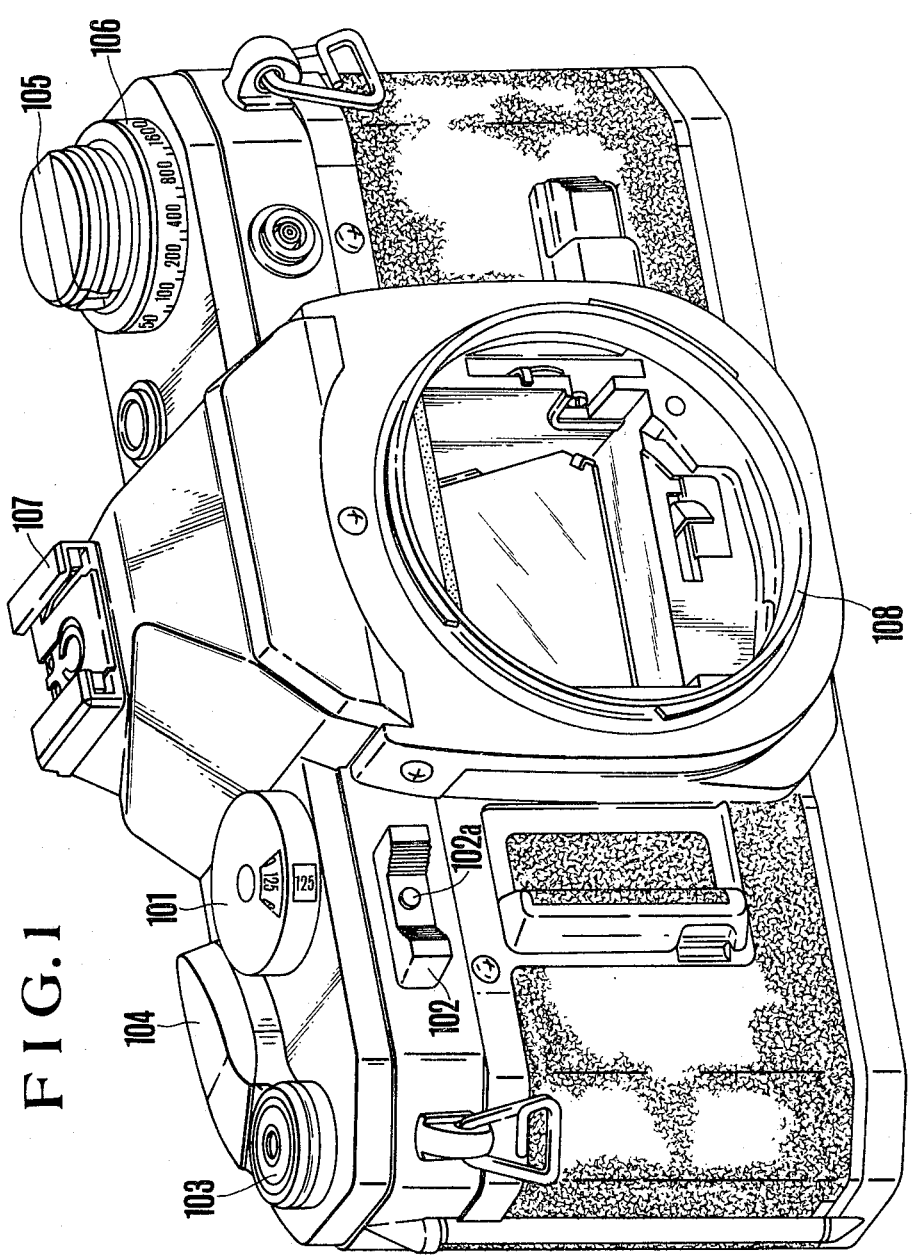
FIG. 1 is a perspective view showing the appearance of one embodiment of a shutter priority automatic exposure camera according to the present invention.

In the following, one embodiment of the present invention will be explained by reference to the drawings. FIG. 1 shows the external appearance of the body of a shutter priority automatic exposure camera. A shutter time display device 101 displays the set value of shutter time. An operating knob 102 sets the shutter time, this knob 102 being rendered movable to the right and the left by depressing a lock button 103. Other features on the AE camera are a winding up lever 104; a rewinding crank 105; a film speed setting dial 106; an accessory shoe 107; and a lens mount 108.

Figure 2:
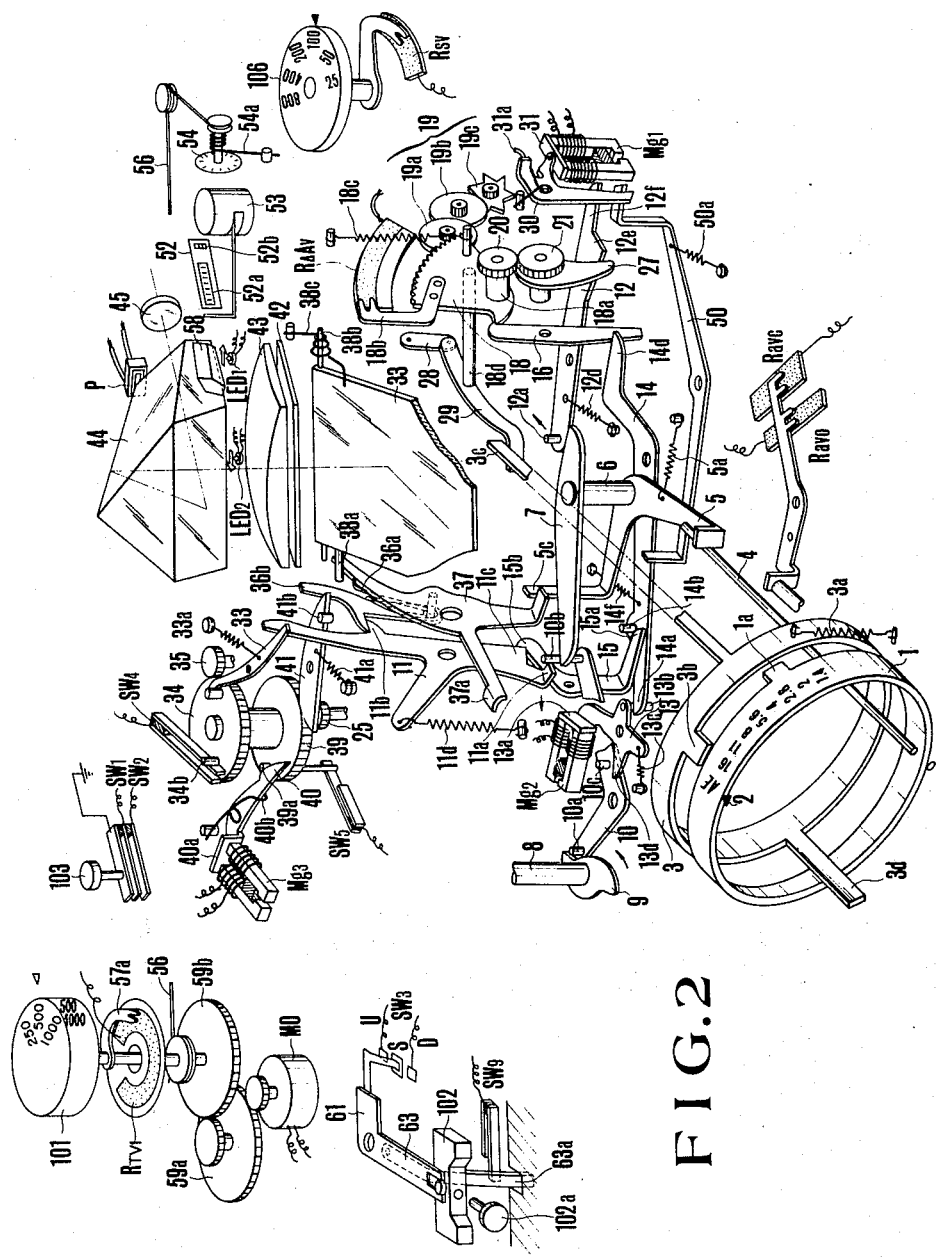
FIG. 2 is an exploded perspective view of the internal structure of the camera shown in FIG. 1.

FIG. 2 shows the internal mechanisms of the camera shown in FIG. 1 in a condition in which the film winding up is completed. In this figure, a diaphragm ring 1 is shown that has a cut thereon, an AE symbol and diaphragm value indicia for manual operation. An index 2 is formed on the ring 1 for registry with the automatic diaphragm symbol AE and the manual diaphragm indicia. A diaphragm presetting ring 3 is biased in a clockwise direction by a spring 3a. The presetting ring 3 also has a protruding portion 3b that is arranged to engage, a protruding portion 1a on the ring 1. The diaphragm presetting ring 3 is further provided with an arm 3c and functions to determine the amount of rotation of a bell crank by a lever 3d through a diaphragm setting cam ring (not shown). This bell crank that is not shown in the drawing regulates rotation of a diaphragm drive ring (also not shown) to determine the size of diaphragm aperture. A pin 4 is secure to the diaphragm drive ring. The pin 4 engages at one end an automatic diaphragm lever 5 that is biased in a counter-clockwise direction by a spring 5a. This automatic diaphragm lever 5 has an upwardly extending portion 5c. Further, an intermediate lever 7 is connected at a common axis to the automatic diaphragm lever 5. A winding up shaft 8 is connected to the winding up lever 104 and to the end face of this winding shaft 8 (FIG. 2) a winding up cam 9. A rotatable intermediate lever 10 has a cam follower or a pin 10a mounted on one end to bear against and engage the winding up cam 9. Further, on the opposite end of the intermediate lever 10 a pin 10b is provided. This pin 10b engages one end of the intermediate lever 7 and also with one end 11a of a mirror drive lever 11. Further, a pin 10c provided on the intermediate lever 10 charges or cocks a first latching lever 13. The opposite end of this intermediate lever 7 is engageable with a pin 12a that protrudes from one end of a rotatable charge lever 12. This charge lever 12 is biased in a counter-clockwise direction by a spring 12d.

An electromagnet Mg2 is combined with a permanent magnet for first latching means. Illustratively, this electromagnet Mg2 attracts one end 13a of a first latching lever 13, and a pin 13b that protudes from the opposite end of the lever 13 bears against an end 14a 1 of a release lever 14. This lever 13, moreover, is biased in a clockwise direction by a spring 13c. Further, when the lever 10 is turned in the clockwise direction, the pin 10c presses against the end 13d and turns the lever 13 in a counter-clockwise direction against the spring 13c. On one end of the release lever 14 has a protruding pin 14b which engages an end 15a of a mirror drive engaging lever 15. The end 15a is opposite to mirrors drive engaging lever end, 15b, with one side 11c of the mirror drive lever 11. The end 15b is in engagement end 14d of the release lever 14 bears against one end of a rotatable AE engaging lever 16. Further, this release lever 14 is biased in a clockwise direction by means of a spring 14f. The spring 14f is weaker than the spring 13c. 18 is an AE sector gear that is engaged with one end of the engaging lever 16.

This sector gear 18 meshes with gears 19a and 19b and a stop wheel 19c, all of which constitute a speed adjusting mechanism 19. Further affixed to the sector gear 18 is a top, or slider 18b of a variable resistor RΔAv (not shown in FIG. 2) for determining a preset diaphragm value. Affixed to the shaft 18a of this sector gear 18 is a gear 20 which meshes with an AE charge gear 21. Coaxially fixed to this gear 21 is a lever 27 which abuts the end of the rotatable charge lever 12 that is opposite to the end of the lever which bears the pin 12a. On the sector gear 18 there also is a pin 18d, of which one end is fixed to a signal lever 29, that is pivotally mounted on a support lever 28. A portion of this signal lever 29 that is bent in a direction generally perpendicular to the lever body engages, the arm 3c of the presetting ring 3. The AE sector gear 18 thus is biased in a clockwise direction by the spring 3a against the force of the spring 18c which urges the sector gear 18 to rotate in a counter-clockwise direction.

A diaphragm control, magnet Mg1 when not energized does not exert attraction force on an aperture 31.

Further, the aforementioned magnet Mg2 and a magnet Mg3 that will be described later have permanent magnets. Accordingly, the magnets Mg2 and Mg3 when energized, provide magnetic forces that act in a reverse direction to that in which the magnetic forces of the permanent magnets act so that, as a whole, no attraction force is exerted. Therefore, when the magnet Mg1 is not supplied with current, an attraction lever 30 which is biased by a spring 31 is engaged with a magnet holding lever 50. This attraction lever 30 is biased by spring 31a to rotate in a counter-clockwise direction, and one bent end of the lever 30 is engageable with the stop wheel 19c of the speed adjusting mechanism 19. Further, the stepped portion of the charge lever 12 abuts the end of the attraction lever 30 that is opposite to the pin 12a.

The mirror drive lever 11 has a delay device that is not shown in the drawing. This mirror drive lever 11 is biased by a spring 11d to rotate in a counter-clockwise direction. The mirror drive lever is arranged in such a position that as previously mentioned, its one end is engaged with the opposite end 15b of the engaging lever 15. The opposite end of the mirror drive lever 11 is engageable with one end of a front curtain latching lever 33. This front curtain latching lever 33 is biased to rotate in a counter-clockwise direction through a spring 33a, the other end of the lever 33 is engaged with a pin 34a that protrudes from front curtain gear 34. Further, there is a pin 34b which also protrudes from the front curtain gear 34 in order to activate a count start switch SW4. This front curtain gear 34 meshes with a front curtain pinion 35 on a front curtain drum (not shown). Further, the aforementioned mirror drive lever 11 has a latching portion 11b which engages a mirror latching lever 36. This latching lever 36 is biased to rotate in a counter-clockwise direction by means of a spring 36a that is connected between the lever 36 and the mirror drive lever 11. One end of the spring 36a bears against a pushing lever 37. As shown in FIG. 2 the pushing up lever 37 is pivoted about a shaft that is common with the mirror drive lever 11. One end portion 37a of the pushing lever 37 is so constructed that it is rotated in a clockwise direction by an external mirror up member (not shown in the drawing), thereby enabling the mirror be moved upward manually. The opposite end portion of this pushing lever 37 engages a rebound pin 38a that is provided on the mirror 38. This mirror 38 is rotatable about the central axis of a mirror shaft 38b. A mirror return spring 38c provides a counter-clockwise biasing force for the mirror 38.

A rear curtain gear 39, separately rotatable from, but in axial alignment with the aforementioned front curtain gear 34, meshes with a gear curtain pinion 25 for a rear curtain drum (not shown). Further, protruding from the rear curtain gear 39. An attraction lever is rotated by the pin 39a. The attraction lever 40 is has an iron piece 40a that attracted by a permanent magnet that accompanies the shutter control magnet Mg3. This attraction lever 40 is biased through a spring 40b that always presses the attraction lever iron piece 40a against the magnet Mg3. A rear curtain signal lever 41 also is rotated by the pin 39a, and is always rotated and held in a position to engage a pin 41b by a spring 41a. The end portion 36b of the mirror latching lever 36 presses against the rear curtain signal lever 41.

Light transmitted through a photographic lens (not shown) is observed with the aid of the mirror 38, a focusing screen 42, a condenser lens 43 and a pentaprism 44, in that order, by a photographer looking through an eye-piece 45. A light receiving element P as, for example, silicon photo cell (SPC) also is optically coupled to the pentaprism, lens screen and mirror assembly. A shutter button 103 in the first stroke actuates a switch SW1 to an ON condition and, on the second stroke, actuates a switch SW2 to an ON condition. Light-emitting diodes LED1 and LED2 are arranged in a portion of the finder system and display diaphragm control limits.

The film speed setting dial 106 is coupled to variable resistor Rsv to provide a film speed input value. A mask 52 also is provided with a diaphragm display plate 52a and with a shutter speed value display window 52b there is, moreover a meter 53 a shutter speed value display plate 54, a line 56 for transmitting the rotation angle of the shutter speed display device 101 to the shutter speed value display plate 54. As shown, the line 56 rotates the shutter speed value display plate 54 against the tension of a spring 54a.

An information prism 58 is attached to the pentaprism 44 to direct the shutter time value and diaphragm value into the finder otical path. The shutter speed display device 101 enclosed in a transparent case (not shown), enables the photographer to read out the shutter time value from its upper and side faces. Mo is a motor for rotating the shutter time display device. This motor Mo not only drives the shutter display device 101 through a gear train 59a and 59b, but also drives, a contact 57a for the shutter time variable resistor RTV1. A contact 57b for the variable resistor RTV2 (Not shown in FIG. 2) beneath the resistor RTV1 also is set through the rotation of the motor mound the gear train 59a and 59b. The operating knob 102, when it is slidingly moved in a horizontal direction as viewed in the figure changes the status of a switch SW3 on a contact lever 61. A lock button 102a is provided on the operating knob 102. When the button 102a depresses a spring member 63 that is mounted on the back side of the contact lever 61, the end portion 63a of the spring member 63 is disengaged from a recessed portion of a main body, causing this disengagement enables the operating knob 102 to be slidable and also causes an auxiliary power switch SW9 to be turned on.

Figure 3:
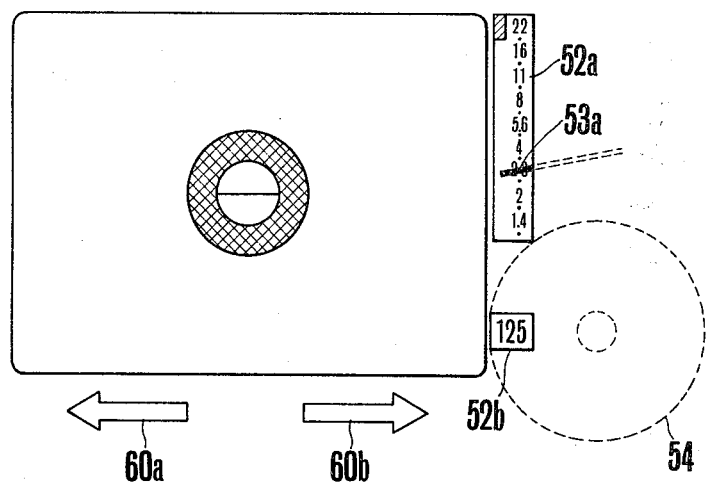
FIG. 3 is a plan view showing a display within a finder of the camera shown in FIG. 2.

FIG. 3 shows a display within the finder of the camera that is illustrated in FIG. 2. In the figure, the shutter time value display plate 54; the shutter time display window 52b, and the diaphragm value display scale plate 52a are shown. The diaphragm value is displayed by causing a pointer 53a that is attached to the meter 53 to indicate this scale on the plate 52a. Warning display marks 60a and 60b are illuminated by the light-emitting diodes LED1 and LED2 when the diaphragm value obtained as a result of computation exceeds an exposure response range.

Figure 4:
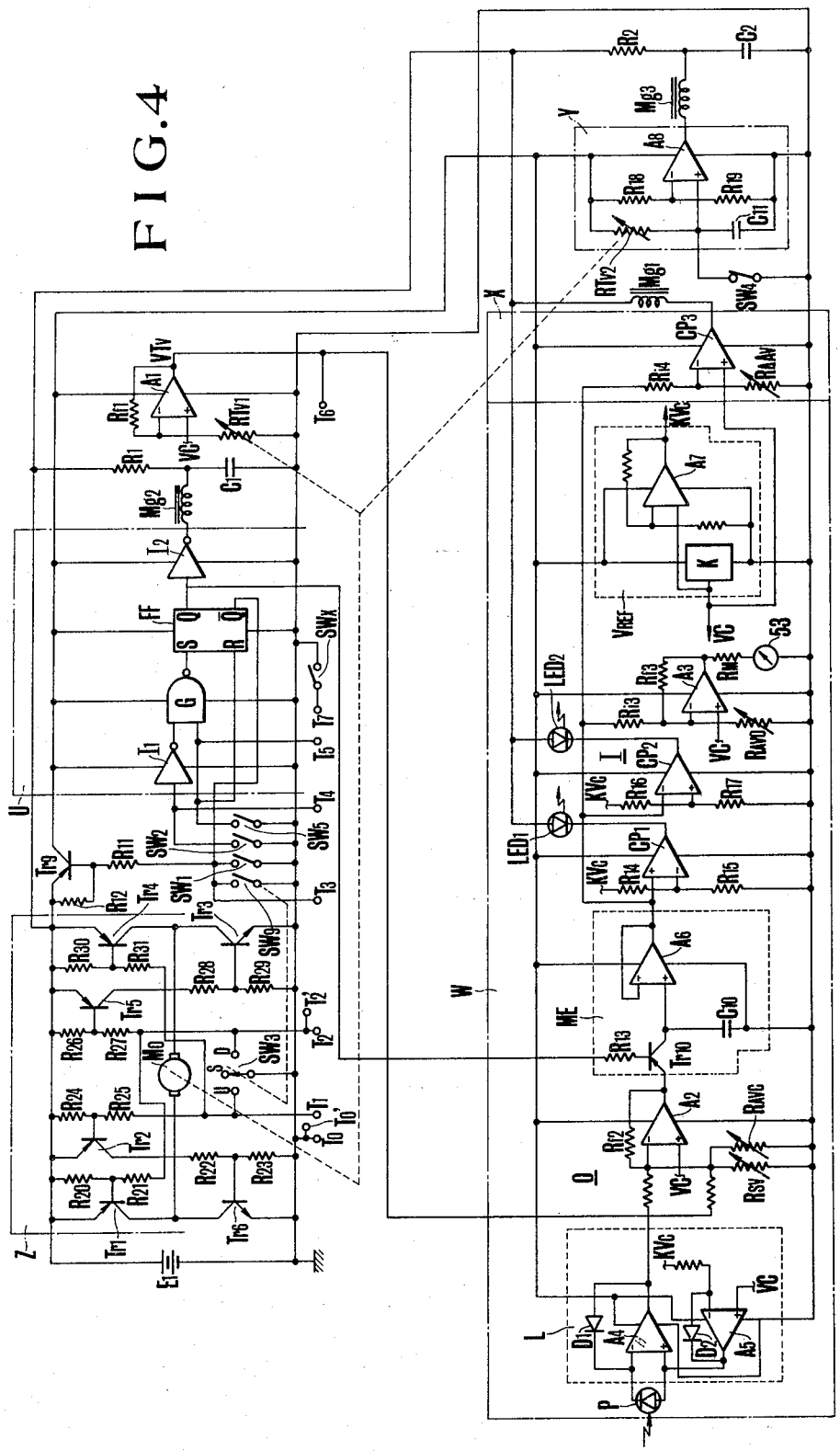
FIG. 4 is a diagram of an exposure control circuit for the camera shown in FIG. 2.

FIG. 4 shows an exposure control circuit for the camera shown in FIG. 1. Electrical power is provided by battery E1. To this electrical power source battery E1 are connected a shutter time adjusting circuit Z, a release circuit U, an exposure value computing circuit W, a diaphragm control circuit X and a shutter time control circuit Y in parallel. A switching transistor Tr9 is connected between the shutter time adjusting circuit Z and the release circuit U. Connected in parallel with the base of this transistor Tr9 are the electrical power switch SW1 and the auxiliary electrical power switch SW9 through a resistor R11. A bias resistor R12 also is coupled across the emitter and base electrodes of the transistor TR9.

The release circuit U comprises an inverter I1 that is connected to a release switch SW2. The output from the inverter I1 is coupled to a path that includes, a NAND gate G, a flip-flop FF, and an inverter I2. The other input terminal of the NAND gate G and the reset input terminal R of the flip-flop FF, moreover, are connected to a switch SW5. The release circuit U also functions as an electrical power holding circuit because of the connection of $\overline{Q}$ output terminal of the flip-flop FF to the base of the aforementioned transistor E1.

The release magnet Mg2 is connected to the output terminal of the inverter I2. C1 is a capacitor that supplies current to the magnet Mg2 after being charged through a resistor R1.

The exposure value computing circuit W comprises a light measuring circuit L, a combining or computing circit O, a memory circuit ME, an indicating circuit I and a voltage generating circuit $V_{REF}$.

The light measuring circuit L comprises of operational amplifiers A4 and A5 with log diodes D1, D2 that are connected as shown in the drawing in order to produce an output signal Bvo that corresponds to the photo-current from the light receiving element P.

The computing circuit O is provided with an operational amplifier A2 to which are applied an output signal from a buffer amplifier A1 and the output signal from the light measuring circuit L. As shown in the drawing, the variable shutter time setting resistor RTv1 and a feedback resistor Rf1 are connected in circuit with the buffer amplifier A1. The film sensitivity setting variable resistor Rsv also is connected to the operational amplifier A2. A curvature correction variable resistor RAvc for aperture opening and a feedback resistor Rf2 complete the resistance nitrode for the operational amplifier A2.

The memory circuit ME comprises a switching transistor Tr10 that are connected to one of the input terminals of, an operational amplifier A6 and the transistor Tr10 is turned ON and OFF by the Q output from the flip-flop FF by way of a resistor R13. When the transistor Tr10 is turned on, the condenser C10 is charged from the output of the operational amplifier A2.

The indicating circuit I has comparators CP1 and CP2 to which the output of the operational amplifier A6 is applied with different poles. The meter 53, moreover, is connected to the output of the operational amplifier A6 through a resistor Ri3. The output terminals of the comparator CP1 and CP2 are connected respectively to the light-emitting diodes LED1 and LED2. The other input terminals of the comparator CP1 and CP2 are connected to resistor voltage dividers R14, R15, and R16, R17 respectively. Also, an output terminal of an operational amplifier A3 is connected to the meter 53 through a resistor RM, while an aperture opening correction variable resistor RAvo connected to one of the input terminal of the amplifier A3. A feedback resistor Rf3 is coupled to operational amplifier A3.

The voltage generating circuit VREF comprises a constant voltage circuit K and an operational amplifier A7. This circuit produces a first constant voltage signal VC and a second constant voltage signal Kvc which are applied to the other portions of the exposure control circuit.

The diaphragm control circuit X comprises a resistor Ri4 and the diaphragm responsive variable resistor RΔAv. Both of these resistors are connected to an input terminal of a comparator CP3 to which the output signal from the operational amplifier A6 is applied. The diaphragm control magnet Mg1 is connected to the output terminal of the comparator CP3.

The time control circuit Y comprises a time constant circuit that includes shutter time setting resistor variable RTv2 and a capacitor C11. Voltage divider resistor R18, R19 complete the resistance network that is connected to the respective input terminals of an operational amplifier A8. The count start switch SW4 also is connected to one of the v input terminals of the operational amplifier A8. A time control magnet Mg3 that is connected to the output terminal of the operational amplifier A8 draws current from a capacitor C2. As illustrated, C2 is a condenser for supplying electrical current the capacitor C2 is charged through a resistor R2.

The shutter time adjusting circuit Z comprises the motor Mo, the changeover switch SW3, transistors Tr1 to Tr6, and resistors R20 to R31. The motor Mo adjusts the variable resistors RTv1 and RTv2. The changeover switch SW3 is enabled to changeover between a contact U' side and a contact D side by manipulating the operating knob 102. When the lock button 102a is pushed to turn on the auxiliary electrical power by activating the switch SW9 and when the switch SW3 is changed over to the U terminal, the transistors Tr2 and Tr4 are turned on. Subsequently, the transistor Tr6 is turned on, causing the motor Mo to rotate the shutter time display device 101 (FIGS. 1 and 2) in an UP direction. Further, when SW3 is changed over to the D terminal, the transistors TR1, and Tr5 and turned on, as well as the transistor Tr3 causing the motor Mo to rotate the shutter time display device 101 in a DOWN direction.

T1 to T7 are connection terminals of an accessory device, and SWx is a synchro-contact.

Next, the operation of the above mentioned structure will be explained.

At first, and as best shown in FIG. 2, in order to set a desired shutter time, the lock button 102a of the operating knob 102 is depressed. A bent piece 63 of the spring member 63 closes the movable contact of the auxiliary electrical power switch SW9, thereby turning on the auxiliary electrical power. In this condition, the base potential of the switching transistor Tr9 (FIG. 4) is lowered to turn the transistor Tr9 ON. In this state, the light measuring circuit L becomes responsive to the signal from the light receiving element P in order to produce the output signal $Bvo$ ($=Bv-Avo-Avc$).

The output signal of the operational amplifier A1 that corresponding to the resistance value of the shutter time resistor RTv1, and the light measuring output from the amplifier A4 are combined by the operational amplifier A2. At the same time, the signals corresponding to the set values of the film speed setting resistor Rsv and the aperture opening valve "F" from the curvature correction setting resistor Ravc are introduced and computed. In other words, the object brightness, shutter time, film sensitivity and diaphragm in Apex indication be denoted by Bv, Tv, Sv and Av respectively. Let also the number of diaphragm stops from the full aperture open F value and the curvature correction that is dependent upon this value due to the light measuring method be represented by Avo, (Av−Avo) or ΔAv and Avc respectively. Because $Av+Tv=Bv+Sv$, we have the above mentioned number of diaphragm stops ΔAv expressed as:

$$\Delta Av = Av - Avo = (Bv - Avo - Avc) + Sv - Tv + Avc$$

where $Bvo = Bv - Avo - Avc$ is the output of the light measuring circuit L that is obtained through a transistor-transistor logic light measurement circuit technique.

The output of the operational amplifier A2 is applied to the memory circuit ME. The ΔAv signal produced from the memory circuit ME is combined by the operational amplifier A3 with the full open F value signal Avo that the variable resistor R avo generated to produce a diaphragm value Av which is displayed by the meter 53 within the finder.

In this manner, after the auxiliary electrical power switch SW9 is closed, upon visual recognition of the proper diaphragm value displayed in the finder and the shutter time value displayed by the shutter display disc 54 (FIG. 2), the photographer can select easily the desired combination of shutter time and diaphragm value. Thus, if the shutter time in the finder should be shifted to the high speed side, the operating knob 102 is moved to the right as viewed in the drawing. By this operation, the switch SW3 contacts the U' terminal so that, as has been described above, the motor Mo is driven through the transistors Tr4 and Tr6 to rotate the shutter time display device 101 (FIG. 1) to the high speed side in accordance, with the specific resistance values of the variable resistors RTv1 and RTv2. If the shutter time should be shifted to the slow speed side, the shift knob 102 is moved to the left as viewed in the drawing. In this circumstance, and as has been described above, the motor Mo is driven through the transistors Tr1 and Tr3 to rotate the shutter time display device 101 to the slow speed side in accordance with the specific resistance values of the variable resistors Rtv1 and RTv2.

This operation may be performed not only when it is merely desired to shift the shutter time, but also when it is desired to change the diaphragm value displayed by the meter 53 in the finder. The manner in which this latter operation is performed with the operating knob 102 is similar to that described above with respect to shutter time.

Further, as the output of the memory circuit ME is applied to the comparators CP1 and CP2, if ΔAv exceeds the control range comparator, CP1 responds to a law Av signal by engaging the light emitting diode LED1, and comparator responds to an high Av signal by engaging light emitting diode LED2.

These two light emitting diodes are arranged under the pentaprism 44 (FIG. 2). Upon being energized they each illuminate a respective one of the arrow-like warning display marks 60a and 60b (FIG. 3) in order to indicate in the finder the direction that the operating knob 102 should be moved.

Next, when the shutter button 103' of a camera is pushed, at first the electrical power switch SW1 is turned on to perform a similar operation to that which occurs when the auxiliary electrical power switch SW9 is turned on. Further, when the shutter button 103' is pushed, the switch SW2 also is earth activated to complete a circuit to ground. At this time, the switch SW5 is turned off so that the output of the NAND gate G becomes "0". This causes flip-flop FF to be set with Q output becoming "1" and with $\overline{Q}$ output becoming "0". As $\overline{Q}=0$, the base current for the electrical power control transistor Tr9 holds the transistor Tr9 in the "ON" state. Further, as Q=1, the memory circuit ME is held "ON" by latching. The Q=1 signal also causes the output of the inverter I2 to become "0". Consequently, the latching magnet Mg2 is energized or turned "ON"

to nullify the field of the associated latching permenent magnet.

Thus, the first latching is released to start camera operation. For this reason, the first latching lever 13 is turned in the clockwise direction by the spring 13c. The pin 13b of the first latching lever 13 drives the one end 14a of the release lever 14 against the force of the spring 14f so that release lever 14 is turned in the counter-clockwise direction.

The pin 14b rotates the mirror drive engaging lever 15, the details being described later. The rotation of the release lever 14 in the counter-clockwise direction, however, causes rotation of the engaging lever 16 in the counter-clockwise direction. This motion disenergizes the lever 16 from the sector gear 18. The holding lever 50 also is turned counterclockwise with the release lever 14 removing to disengage the holding lever 50 from the attraction lever 30.

The rotation of the sector gear 8 is transmitted through the pin 18d to move the signal lever 29 downwardly. In this circumstance the diaphragm presetting ring 3 of which the arm 3c is engaged with this signal lever 29 rotates the sector gear 18 in the clockwise direction under the action of the spring 3a and against the force of the spring 18c. For this reason, the gears 19a, 19b and 19c that form the speed adjusting mechanism 19 rotate in directions that enable the last stage stop wheel 19c to rotate in a counter-clockwise direction. The rotation of the sector gear 18 further causes the slider 18b of the variable resistor RΔAv to move. The output ΔAv of the memory circuit ME (FIG. 4) and the resistance value are compared by the comparator CP3. When a predetermined signal level is reached, the electrical power supply to the electromagnet Mg1 is cut off to remove the armature 31. For this reason, the attraction lever 30 is rotated by the spring 31 in a counter-clockwise direction, and its bent portion 31a engages the stop wheel 19c to arrest the rotation of this wheel.

Thus, in this foregoing manner the position of the sector gear 18 is determined. Therefore, when the rotation of the sector gear 18 is stopped as described above, the diaphragm presetting ring 3 is rotated to a position for the proper diaphragm value, thereby fixing the position of the bellcrank (not shown). In other words, the stop position of the diaphragm presetting ring 3 depends upon the diaphragm value determined by the information from the light receiving element P for light measurement through the photographic lens and the various set information, namely, shutter speed, film sensitivity, and exposure correcting data.

On the other hand, in parallel with this start of the automatic exposure operation, the automatic diaphragm mechanism also is activated. The first latching lever 13 rotates in the clockwise direction under the influence of the spring 13c. The release lever 14 with the pin 14b is rotated in the counter-clockwise direction to cause the end portion 15a of the mirror drive engaging lever 15 to rotate in the clockwise direction. The one side 11c of the mirror drive lever 11 and the one end 15b of the mirror drive engaging lever 15 are disengaged from each other to permit the mirror drive lever 11 to rotate in a counter-clockwise direction in response to the spring 11d. At the same time, as the pawl portion 11b of the mirror drive lever and the latching lever 36 are engaged with each other, the pushing lever 37, pivotally supporting the latching lever 36, rotates in a counter-clockwise direction. A bent portion 37b of the pushing lever 37 engages with the upwardly extending portion 5c of the automatic diaphragm lever 5 in order to rotate the lever 5 in a clockwise direction. Consequently, the pin 4 secured to the diaphragm drive ring (not shown in the drawing) is operated to close the diaphragm in accordance with the position of the aforementioned bell crank (not shown). This counter-clockwise movement of the pushing lever 37 causes the rebound pin 38a of the mirror 38 to be pushed upwardly and thus compel the mirror 38 to snap up.

The delay device that is not shown in the drawing operates together with this upward movement of the mirror 28. At the expiration of the delay time that is established by this delay device, the front curtain latching lever 33 is rotated in the clockwise direction also by the mirror drive lever 11. The delay time assures that the shutter will not start until a period of time has elapsed that is equal to the time required for the diaphragm to change from maximum to minimum aperture. For this reason, the front curtain gear 34 starts to rotate, removing the front curtain through the operation of the front curtain pinion 35. The count start switch SW4 is turned off by the front curtain removal. After the shutter time that is determined by the variable resistor $RT_{V1}$ elapses, the control circuit Y applies a pulse to the electromagnet Mg3. In this manner, the magnetic force of the permanent magnet is cancelled by the magnetic force of the magnet Mg3. For this reason, the lock that the attraction lever 40 applied to the rear curtain gear 39 is released. The rotation of the rear curtain gear 39 now can commence, causing the rear curtain to run down through the rear curtain pinion 25. Further, when the rear curtain has run down to the terminal position, the rear curtain signal lever 41 is rotated in the counter-clockwise direction by the pin 39a as the rear curtain gear 39 rotates. This results in the clockwise rotation of the mirror latching lever 36 in order to disengagement the lever 36 from the mirror drive lever 11. The pushing lever 37 is rotated in a clockwise direction by the spring 5a through the action of the automatic diaphragm lever 5, permitting the mirror 38 to returned to the initial position under the influence of the return spring 38c. At the same time, the automatic diaphragm lever 5 is rotated in a counter-clockwise direction by the spring 5a, and the pin 4 of the diaphragm drive ring (not shown) returns to enable the diaphragm aperture to return to the initial full open position. And, when the winding up operation is performed by the winding up shaft 8, the film rewinding and shutter charging also are performed. The charge lever 12 is charged, or cocked, through the intermediate levers 10 and 7 along with charging or setting the automatic diaphragm mechanism and mirror mechanism, thereby enabling those parts of the apparatus which are disengaged by the described release operation to become again engaged and return to the positions illustrated in FIG. 2.

Next, the situation in which a motor drive unit is attached to the camera that is shown in FIGS. 1 to 4 will be explained. In this circumstance the shutter time setting operation and the release operation are made available on the side of the motor drive unit.

Figure 5:
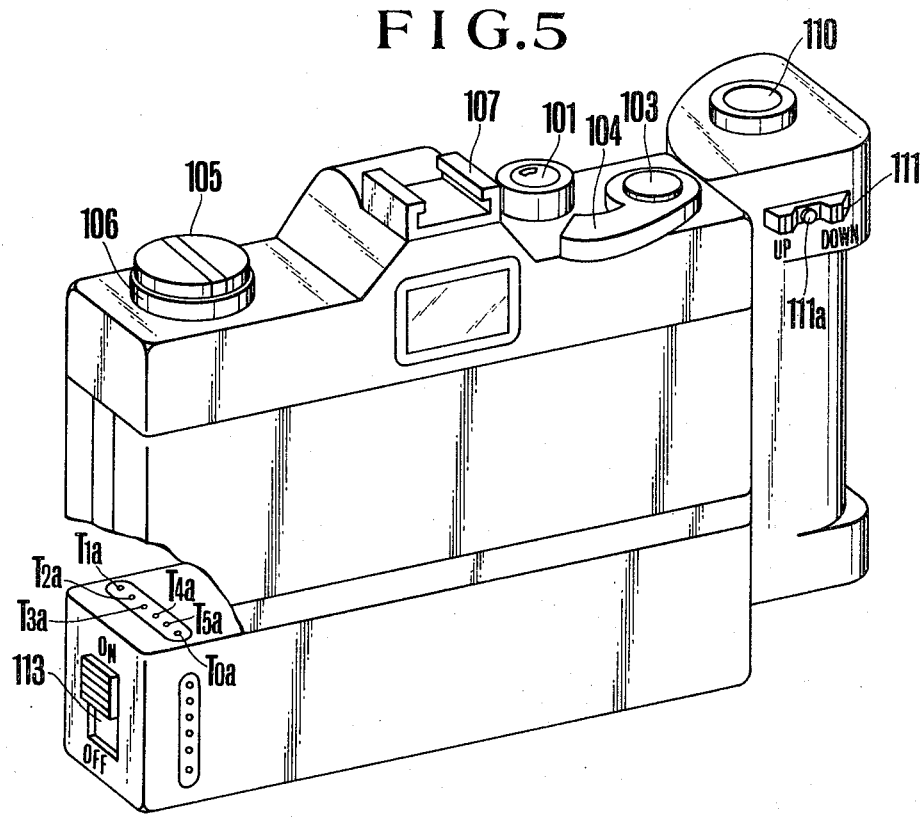
FIG. 5 is a perspective view of the camera of FIG. 1 with a motor drive unit attached thereto.

FIG. 5 shows the motor drive unit attached to the camera of FIG. 1. A release button 110 is provided on the motor drive unit side. An operating knob 111 with a lock button 111a also is made available. These features perform similar operations to that which the operating knob 102 of the camera accomplishes. A knob 113 activates an electrical power switch. Terminals T0a, T1a, to T5a also are provided to establish electrical contact with the terminals T0, T1, to T5 on the camera side.

Figure 6:
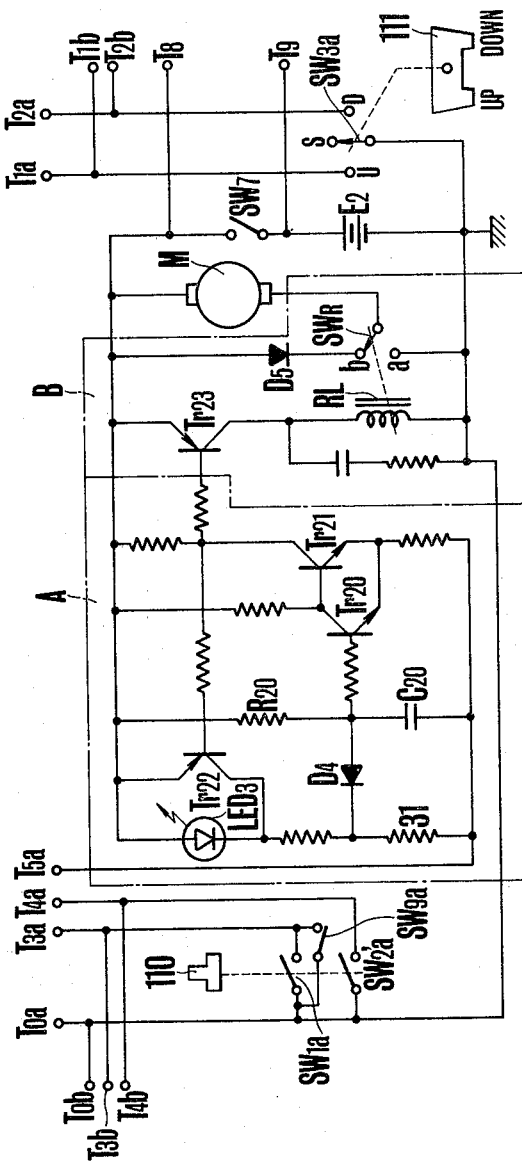
FIG. 6 is a diagram of a control circuit for the motor drive unit that is shown in FIG. 5.

FIG. 6 is an electrical circuit diagram of the motor drive unit shown in FIG. 5, with the terminals T0a, T1a to T5a. Switches SW1a and SW2a are turned on by the first stroke and the second stroke, respectively, of the release button 110. An electrical power switch SW7 is turned on and off by the knob 113, while is a changeover switch SW3 which is changed over by manipulating the operating knob 111. Switch SW9a is connected in parallel to the switch SW1a and turned on by means of the lock button 111a. An electrical power source battery E2 is connected through the electrical power switch SW7 to a delay circuit A, a switching circuit B and a motor M. A light-emitting diode LED3 indicator the operational state of the motor drive unit.

The delay circuit A provides a sufficient time delay to permit wind up. This delay circuit A is constructed from a timing circuit that comprises a resistor R20 a capacitor C20 and transistors Tr20, Tr21 and Tr22.

The switching circuit B comprises a relay RL that is connected to a transistor Tr23. The transistor TR23 is turned on and off in response to the output from the delay circuit to selectively energize the relay RL, which as shown in FIG. 6, activates the changeover switch SWR. In this manner the motor M is controlled through the operation of the switch SWR.

Therefore, when the lock button 111a of the operating knob 111 is pushed, the switch SW9a is turned on to display the diaphragm value in the finder in a manner similar to that described in connection with the switch SW9. Subsequently, if the operating knob 111 is operated, the switch SW3a is manipulated to enable the photographer to select the desired shutter time and diaphragm value in essentially the same manner as that which was described above with respect to the switch SW3 in FIG. 4. Exposure is controlled through the release button 110. By depressing the button 110, switch SW1a is turned on. Subsequently, the switch SW2a is turned on causing the camera to operate in a similar manner to that which was described in connection with the exposure control function of the switches SW1 and SW2.

When the switch SW5 in the camera is turned on in response to the movement of the shutter rear curtain (not shown), the delay circuit A is activated. Accordingly, the condenser C20 is charged through the resistor R20. At this time, the transistor Tr20 is OFF or nonconducting and the transistor Tr21 is ON, so conducting, or that the transistor Tr23 in the switching circuit B is also ON. As mentioned above, with the transistor Tr23 conductor the relay RL is energized and causes the switch SWR to establish electrical contact with the terminal "a". In these circumstances the motor M is connected from the electrical power source E2 to ground through switches SW7 and SWr in order to start rotation.

If the charging time constant of the time constant C20, R20 is made long, the circuit motor M continues rotating until winding up is completed. After winding up, is complete the switch SW5 is turned off, rendering the transistor Tr20 in the delay circuit A inoperative. In these circumstances the charge on the condenser C20 discharges swiftly through a diode D4 and the resistor R31'. When the transistors Tr20 and Tr21 are thus rendered inoperative, the base potential of the output transistor Tr23 reaches the positive potential (+) of the electrical power source E2 thereby causing the transistor Tr23 to turn off. With the transistor Tr23 in a nonconducting state the current flowing through the relay RL shifts the contact in the switch SWR from terminal "a" to terminal "b". In this condition, the counter electromotive force of the motor M flows through the didoe D5 in order to stop the motor M rapidly. If the release button 110 continues to be depressed, after the motor M is stopped, a release is effected again to perform continuous photography. If the depression of the release button 110 is withdrawn, is stopped in the completed winding up state, and the continuous photography is completed.

It is to be noted here that T0b, T1b to T4b shown in FIG. 6 are terminals which enable a remote control device to be connected to the motor drive unit.

Figure 7:
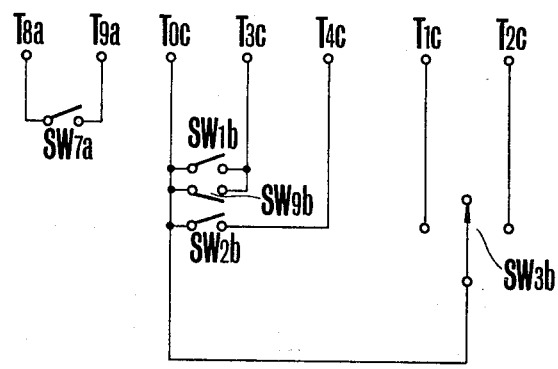
FIG. 7 is a diagram of a remote control circuit to be connected to the circuit of FIG. 5.

FIG. 7 is a circuit for use in connection with a remote control device. Terminals T4c, T0c, T8a and T9a are to be connected electrically with the respective terminals T1b to Trb, T0b, T8a and T9a through conductor. Switch SW7a is connected in parallel with the switch SW7. Switches SW1b and SW2b are turned on by depressing a release button on the remote control device in first and second strokes. Switch SW9b, moreover, is turned on through manipulation of a lock button on an operating knob on the remote control device. These switches are operated in a similar manner to that described in connection with the operation of the switches to control camera operation and the motor drive unit.

Using a remote control device that is provided with a television monitor as shown in FIG. 8, the finder display can be monitored to permit remote control selection of the shutter time and diaphragm value. In FIG. 8 shows a camera body 100; a motor drive unit 120; a photo-taking device 121; a television monitor device 122. This monitor device 122 is provided with an operating knob 123 having a lock button 123a, a release button 124 and an operating button 125 for the switch SW7a.

Figure 9:
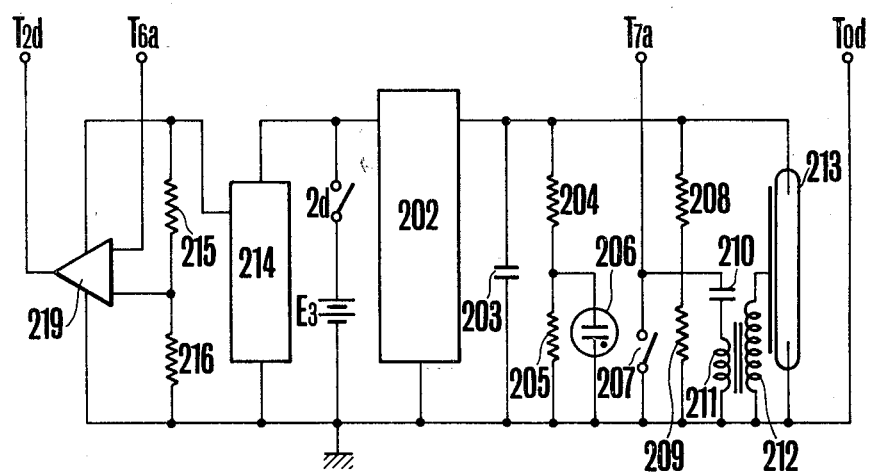
FIG. 9 is a circuit diagram of a flash device connectable to the circuit of FIG. 4.

Next, FIG. 9 shows an electronic flash or strobe device to be attached to the camera shown in FIGS. 1 to 4. In the drawing, T2d, T6a, T7a and T0d are terminals for establishing electrical contact with the terminals T2', T6, T7 and T0' of the camera shown in FIG. 4, when the strobe device is attached to the camera. An electrical power source, or battery E3 also is included in the strobe device, along with an electrical power switch 201 and a DC boosting circuit 202. The DC boosting circuit comprises, for example, a blocking oscillator. The high voltage direct current output from the boosting circuit 202 charges a main capacitor 203 when the switch 201 is ON to complete the circuit for the batery E3. Voltage dividing resistors 204 and 205 and a neon discharge lamp 206 constitute a circuit for indicating the charging voltage status of the main capacitor. A trigger switch 207 provided on the side of the strobe device. This switch is closed in order to make the flash device continuously luminous. Voltage dividing resistors, 208,209 a capacitor 210 and a transformer having primary and secondary winding 211,212 constitute a trigger pulse generating circuit for actuating a typical strobe discharge tube 213. A constant voltage circuit 214 generates an output that is supplied to a comparator 219. Voltage dividing resistors 215 and 216 obtain a specified shutter time for the flash device. Illustratively, the terminal voltage of the resistor 216 is applied to the comparator 219 and is compared with the camera's set shutter time voltage VTv which is introduced through the terminal T6a.

The terminal T2d is positioned so that the output of the comparator 219 is directed to the DOWN side or "D" terminal of the camera's time shift switch SW3 (FIG. 4). A synchro-terminal camera is J7a triggers the strobe actuating circuit when the camera's synchro-switch SWx (FIG. 4) is ON.

The operation of the electronic flash device attached to the camera in flash photography will be explained. When the electrical power switch 201 of the strobe side is turned on, the boosting circuit 202 is operated to charge the main capacitor 203. When the voltage of the main capacitor 203 becomes higher than a reference value, the neon discharge tube 206 is lighted, indicating that the firing preparation of the flash discharge tube 213 is completed. The subsequent shutter release operation of the camera turns on the synchronous firing actuating contact SWx (FIG. 4) in synchronism with the actuation of the shutter. This signal is transmitted through the terminals T7 and T7a (FIG. 9) to the strobe side so that the charge on the capacitor 210 flows through the primary coil 211 of the transformer, while a high voltage pulse is produced in its secondary coil 212 that enables the flash discharge tube 213 to emit light.

On the other hand, as a constant voltage appears at the output terminal of the constant voltage circuit 214 when the electrical power switch 201 is turned on, the voltage dividing resistor 216 produces a signal that corresponds to the shutter time specified by the strobe device. This signal is applied to the comparator 219. Also applied to the comparator 219 is the signal VTv from the shutter time set is the camera through the terminals T6 (FIG. 4) and T6a (FIG. 9). These two signals are compared by the comparator 219. The comparator 219 produces an output only when the camera's set time is shorter (faster shutter) than strobe the specified time. This comparator output is applied to the "down" or D terminal of the camera shift switch SW3 (FIG. 4) through the terminals T2d and T2'.

For example, when the shutter time set on the camera is 1/500 second and when the specified time of the strobe side is 1/60 second, the output from the comparator 219 is transmitted through the terminals T2d and T2' to the camera and, as has been described above, the shutter timeadjusting circuit Z (FIG. 4) is operated to drive the motor Mo so that the time setting variable resistors RTv1 and RTv2 are adjusted. This variation of RTv1 is applied through the buffer amplifier A1 to the next-stage exposure value computing circuit W the signal from the amplifier A1 also is sent through the terminals T6 and T6a (FIG. 9) to feedback to the comparator 219. After the comparison of the set time signal from the camera with the specified time signal from the strobe device produces a output of zero from the comparator 219 the set time of the camera side coincides with the specified time (1/60 second) of the strobe device. In this state, the camera's time adjustment operation is stopped to determine the set time. The subsequent operation is as mentioned above, flash photography being accomplished with normal shutter time. When the camera's set shutter time is longer than the specified time for the strobe side, (for example 1/30 second), the comparator 219 produces no output signal so that no time shift operation is performed in the camera. In these circumstances, the set time in the camera does not change and flash photography is performed in that set state. In this case also, the shutter time is within a range of strobe synchronization times so that synchronized flash photography also it possible.

Figure 10:
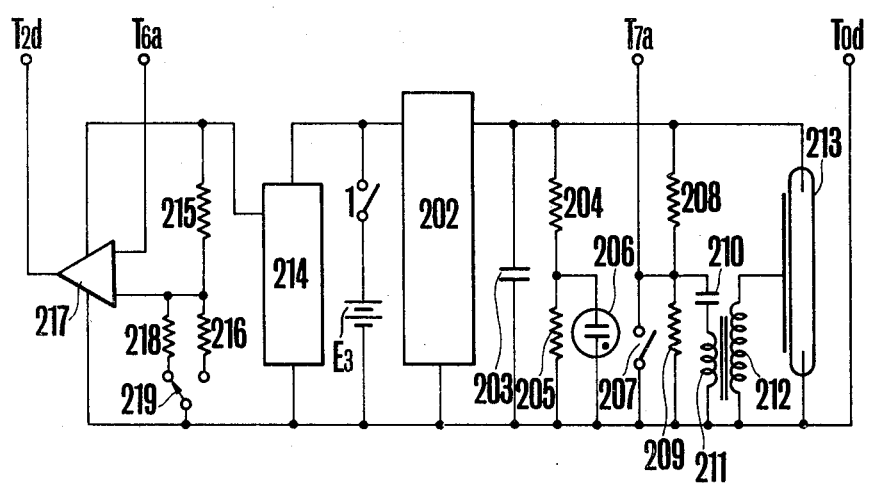
FIG. 10 is a similar diagram showing another example of a flash device.

FIG. 10 is a circuit diagram showing another example of the flash device, similar to that which is shown in of FIG. 9, and in which the same parts are denoted by the same reference symbols. In the drawing, those parts which are different from the circuit of FIG. 9 are in the input circuit in comparator 217 in which specified time setting resistors 216 and 218 of the strobe circuit are selected through manipulation of a switch 219. In other words, depending on the shutter characteristics of the particular camera, as the shortest allowable shutter time capable of synchronization flash photography is different for each camera, this difference is taken into account by shifting the switch 219' to the appropriate set value for the strobe circuit. For example, even if a focal plane shutter is used, the shortest shutter time that can be synchronized with the light emission from the flash device differs depending on the shutter running in the long and short side directions. In these circumstances, the strobe circuit is changed to effect an optimum state. By constructing the strobe circuit in such a manner, synchronization flash photography is possible with whatever shutter time is set at the time of flash photography.

Next, a diaphragm priority automatic exposure camera that characterizes another embodiment of the present invention is described. In this description same reference numerals have been employed to denote the same parts as those of the above-described shutter priority automatic exposure camera and a specific explanation of these common parts is omitted. The external appearance of the camera body for a diaphragm priority automatic exposure camera that is illustrated in FIG. 11 is the same as that which is shown in FIG. 1, except for the use the shutter time display device 101 (FIG. 1) as a diaphragm value display device 101' and of the operating knob 102 for the setting of shutter speed as an operating knob 102' for the setting of diaphragm value.

Figure 11:
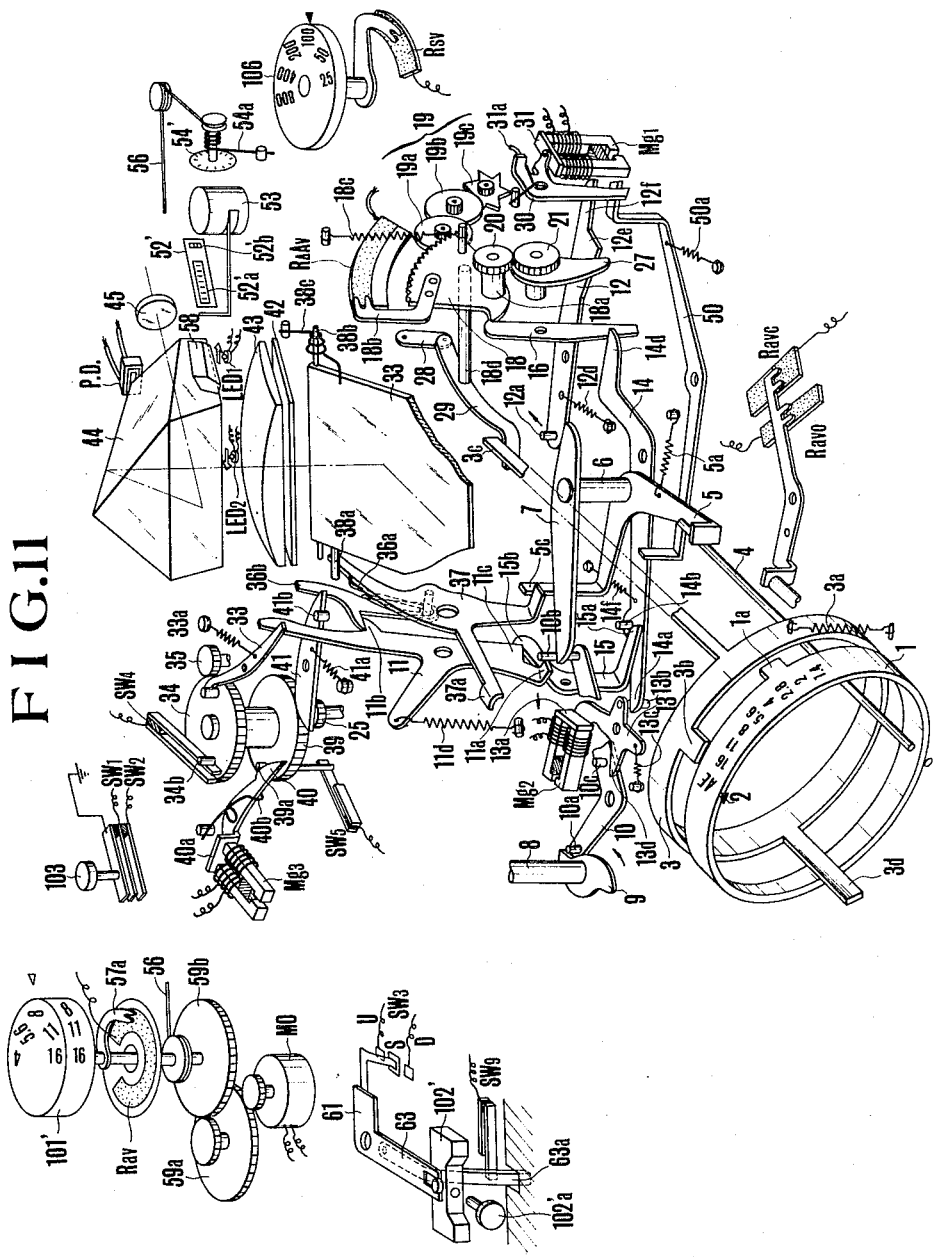
FIG. 11 is an exploded perspective view of another embodiment of a diaphragm priority automatic exposure camera according to the present invention.

FIG. 11 shows the internal mechanisms of the diaphragm priority automatic exposure camera. Those parts which are different from the parts shown in FIG. 2, includes a mask 52' provided with a shutter time indicating plate 52a' and a diaphragm value indicating window 52b'. A meter 53, a diaphragm value indicating plate 54'; and a line or cord 56 for transmitting the rotation angle of the diaphragm display device 101' to the diaphragm value indicating plate 54' is also shown. The diaphragm value indicating plate 54' is rotated by the line 56 against the tension of a spring 54a. A motor Mo rotates the diaphragm diaplay device 101'. This motor controls a diaphragm value setting variable resistor Rav through gears 59a and 59b. As shown, the operating knob 102' for diaphragm value adjustment is slidably moved to either the right or to the left as viewed in the drawing to shift a movable contact on the lever 61 which in turn, causes the switch SW3 to change contacts.The lock button 102a' on the operating knob 102', when activated completes the circuit for the auxiliary electrical power switch SW9 through the spring member 63 that is provided on the end of the contact lever 61.

Figure 12:
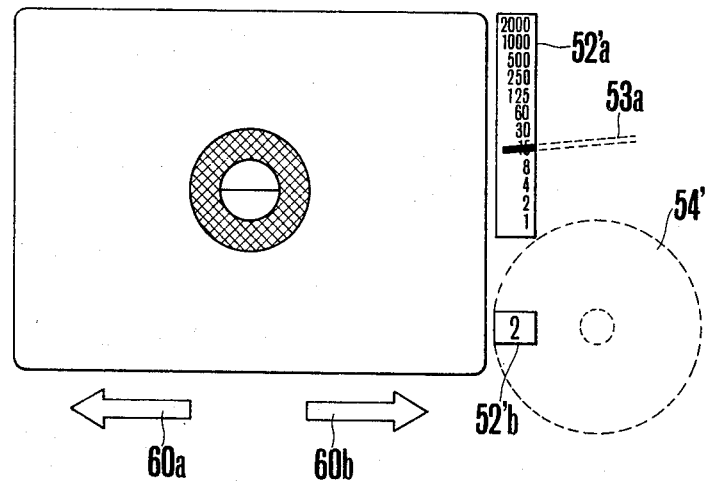
FIG. 12 is a plan view showing a display within a finder of the camera shown in FIG. 11.

FIG. 12 illustrates the visual display in the finder of the camera that is shown in FIG. 11. In the drawing, the finder presents to the photographer the diaphragm value indicating plate 54'; 52a' is a shutter speed scale plate 52a' and the diaphragm value indicating window 52b. Use pointer 53a of the member 53 (FIG. 11) indicates the shutter time on the scale plate 52a'. The warning display marks 60a and 60b are illuminated when the computed shutter time exceeds an exposure response range.

FIG. 13 shows an exposure control circuit for the camera that is shown in FIG. 11. The battery E1 is connected in parallel to a diaphragm value adjusting circuit Z', a release circuit U, an exposure value computing circuit W', a diaphragm control circuit X', a display circuit I' and a time control circuit Y'. The switching transistor Tr9 connected between the diaphragm value adjusting circuit Z' and the release circuit U. The electrical power switch SW1 and the auxiliary electrical power switch SW9 are connected in parallel to the base of this transistor Tr9 through the resistor R11. A R12 also is connected to the transistor Tr9 bias resistor.

The release circuit U is constructed in a similar manner to the release circuit shown in FIG. 4. Accordingly, the release electromagnet Mg2 is connected to the output terminal of the inverter I2. After being charged through the resistor R1 the capacitor C1 supplies electrical current to the electromagnet Mg2.

The exposure value computing circuit W' comprises the light measuring circuit L, a computing circuit O', the memory circuit ME and the voltage generating circuit $V_{REF}$. No the light measuring circuit L, the memory circuit ME and the voltage generating circuit $V_{REF}$ are essentially the same as those shown in FIG. 4.

The computing circuit O', however, is provided with an operational amplifier A2, one of the input terminals of which receiver the output signal from a buffer amplifier A1. This buffer amplifier signal corresponds to the diaphragm value setting resistor RAv which also reflects the effect of a feedback resistor Rf1. The output signal from the light measuring circuit L additionally is applied to this same input terminal of the operational amplifier A2. Further components connected to this operational amplifier A2 are the film seed setting resistor Rsv, the aperture opening curvature correction variable resistor RAvc and the feedback resistor Rf2.

The output from this operational amplifier A2 is applied to the aforementioned memory circuit. Thus, the output terminal of the operational amplifier A6 in the memory circuit ME is connected to the meter 53.

The time control circuit Y' comprises a transistor Tr30 and a capacitor C30 to which the output of the operational amplifier A6 is applied. The operational amplifier A8 within the time control circuit Y' has two input terminals, one of which is connected to the computing circuit and the other of which is connected to a the voltage divider of resistors R18 and R19. The count switch SW4 for turning on and off a transistor Tr31 is connected in parallel to the capacitor C30. The time control magnet Mg3 is connected to the output terminal of the operational amplifier A8. This capacitor C2, after being charged through the resistor R2, supplies electrical current to the magnet Mg3.

The display circuit I' is provided with the comparators CP1 and CP2 which are coupled with different polarity input terminals to the output of the operational amplifier A6. The output terminals of the comparators CP1 and CP2 are connected, respectively, to light-emitting diodes LED1 and LED2. The other input terminals of the comparators CP1 and CP2 each are connected to the respective pairs of voltage dividing resistors R14, R15 and R16, R17. The diaphragm control circuit X' comprises the comparator CP3, to which the combined output signals of the operational amplifier A1 and an operational amplifier A10 are applied. This same input terminal of the comparator CP3 also is connected to the diaphragm responsive resistor RΔAv. To the input of the operational amplifier A10 is applied the output of an operational amplifier A11 which, in turn, has the aperture opening correction variable resistor RAvo at its input. This operational amplifier A11 has a feedback resistor Rf4 connected thereto. The output terminal of the amplifier A11, moreover, is connected to the variable resistor Rsv and the curve correction variable resistor RAvc. The diaphragm control magnet Mg1 is coupled to the output on the comparator CP3.

The diaphragm adjusting circuit Z' is constructed in a similar manner to that in which the shutter time adjusting circuit is constructed, the motor Mo being adapted to adjust the variable resistor RAv.

In operation to set a desired diaphragm value, the lock button 102a' (FIG. 11) of the operating knob 102' is first depressed to cause the bent piece end portion 63a of the spring member 63 to press closed the movable contact of the auxiliary electrical power switch SW9, in order to lower the base potential of the switching transistor Tr9 (FIG. 13) and render the transistor Tr9 conducting. In this state, the light measuring circuit L responds to the signal from the light receiving element P in order to produce signal Bvo (=Bv−Avo−Avc). This Bvo signal is combined with the output of the diaphragm setting variable resistor RAv through the operational amplifier A2. At the same time, the film speed setting variable resistor Rsv and the full open F value curvature correction setting resistor RAvc produce respective output signals which are also subjected to the computation. Thus, let the object brightness, shutter speed, film sensitivity and diaphragm value in Apex representation be denoted by Bv, Tv, Sv and Av respectively. Also let the full open F value be represented by Avo, the number of aperture stops from the full open F value (Av-Avo) be identified by ΔAv and the curvature correction quantity that corresponds to the full open F value due to the light measuring method be represented by Avc. Because there is a relationship $Av+Tv=Bv+Sv$, the shutter time information Tv is expressed as:

$$Tv=(Bv-Avo-Avc)+Sv-Av+Avo+Avc$$

wherein $Bvo=Bv-Avo-Avc$ is the output of the light receiving element in the transistor transistor logic light measuring mode.

The output from the operational amplifier A2 is applied to the memory circuit ME, and this memory circuit ME produces the shutter time signal to which is displayed by the meter 53 in the finder.

In this manner, after the auxiliary electrical power switch SW9 has been closed to complete the current, while observing the display of the proper time value and the diaphragm value on the diaphragm indicating plate 54' (Mg 12) in the finder, the photographer can easily select the combination of the desired shutter time and diaphragm value. In other words, if in response to the diaphragm value in the finder, it is desired to shift toward a smaller aperture, the operating knob 102' is moved to the right as viewed in the drawing. In this circumstance the motor Mo is energized to drive the diaphragm display device 101' to rotate toward the smaller aperture. Further, if a shift toward a full-open aperture is desired, the operating knob 102' is moved to the left as viewed in the drawing, thereby causing the motor Mo to rotate the diaphragm display device 101' toward a full-open aperture.

This operation may apply not only to the case in which it is desired to change the diaphragm aperture, but also to the case the in which it is desired to shift to shutter time that is displayed by the meter in the finder. That is effected in a similar manner to the above by manipulating the operating knob 102'. Further, as the output of the memory circuit ME (FIG. 13) is applied to the comparators CP1 and CP2 when the shutter time signal Tv exceeds the limits of its range the comparator, CPI on the low side to illuminate the light emitting diode and comparator CP2 responds on the high side of the range to illuminate the light emitting diode. These two LEDs are arranged under the pentaprism 44 (FIG. 11) to illuminate the arrow-like mask as shown in FIG. 12. In this manner the direction in which the operating knob 102' (FIG. 11) should be moved is indicated.

Next, when the shutter button of the camera is depressed, the electrical power switch SW1 (FIG. 13) is at first turned on, thereby maintaining the transistor Tr9 in the conducting state to supply electrical power to the circuits. For this reason, the display mentioned above continues to be effective.

Next, the shutter button is further depressed. This second stroke the switch SW2 in order to produce a "0" output signal from the NAND gate G. This output signal latches the flip-flop FF in a state that keeps the switching transistor Tr9 conducting. At the same time, the magnet Mg2 is supplied with a pulse of electrical current from the condenser capacitor C1, causing the first latching lever 13 of FIG. 11 to be released from the attraction force and then to rotate in a clockwise direction. In this manner the camera operation is similarly operated in a shutter priority mode.

As the sector gear 18 is turned, the slider 18b of the variable resistor RΔAv is moved. This resistance value is compared with the output value of the operational amplifier A10 by the comparator CP3. When a predetermined level is reached, the magnet Mg1 is deenergized to permit the armature 31 (FIG. 11) to be moved away from the magnet. For this reason, the attraction lever 30 is turned in a counter-clockwise direction by the spring 31a, and its bent portion engages the stop wheel 19c in order to stop that wheel's rotation. In this manner the position of the sector gear 18 is determined.

As mentioned above, when the rotation of the sector gear 18 stops, the diaphragm preset ring 3 turns to the position of the set diaphragm value, thus fixing the position of the bell crank (not shown). Considered in another way, the stopped position of the diaphragm presetting ring 3 corresponds to the set diaphragm value.

On the other hand, in parallel with the start of this operation, the automatic diaphragm mechanism also starts to operate. As the first latching lever 13 is turned in a clockwise direction by the spring 13c, the release lever 14 is turned in the counter-clockwise direction, as in the shutter priority actuation to close down the diaphragm mechanism and to move the mirror 38 in an upward direction. At this point the shutter front curtain starts to run down. This running of the front curtain turns off the count switch SW4.

After a time dependent upon the set diaphragm value, the brightness of an object being photographed, and the film sensitivity, the control circuit Y' (FIG. 13) energized to apply a pulse to the magnet Mg3. When the winding is so pressed, the magnetic force of the permanent magnet is cancelled by the magnetic force of the magnet Mg3, the permanent magnet thereby losing its attraction force. For this reason, the attraction lever 40 is released from the locking connection with the rear curtain gear 39, causing the rear curtain gear 39 to commence rotation and cause the rear curtain to run down through the rear curtain pinion 25. Further, at the time the running down of the rear curtain terminates, the rear curtain signal lever 41 is turned in the counter-clockwise direction by the pin 39a, on the rear curtain gear 39.

The subsequent operation proceeds in a similar manner to that of the shutter priority with the mirror 38 returned and with the diaphragm reset to the initial full open position. When the winding up shaft 8 performs the winding up operation the film is wound up and the shutter is charged, while the charge lever 12 is charged through the intermediate levers 10 and 7. The automatic diaphragm mechanism and the mirror mechanism are also charged, with the resulting positions being shown in the drawings, which those parts released from engagement by the aforementioned release operation are again brought into engagement.

When motor driven photography is undertaken by mounting a motor drive unit on a diaphragm priority automatic exposure camera, the photographer only need to bring the terminals T0, T1 to T5 of FIG. 13 into contact with the terminals T0a, T1a to T5a shown in FIG. 6. The operation is performed in a similar manner to that shown in connection with shutter priority technique by reference to FIGS. 5 and 6. Further, when the remote control unit is used, the arrangement of FIGS. 7 and 8 also may apply.

Figure 14:
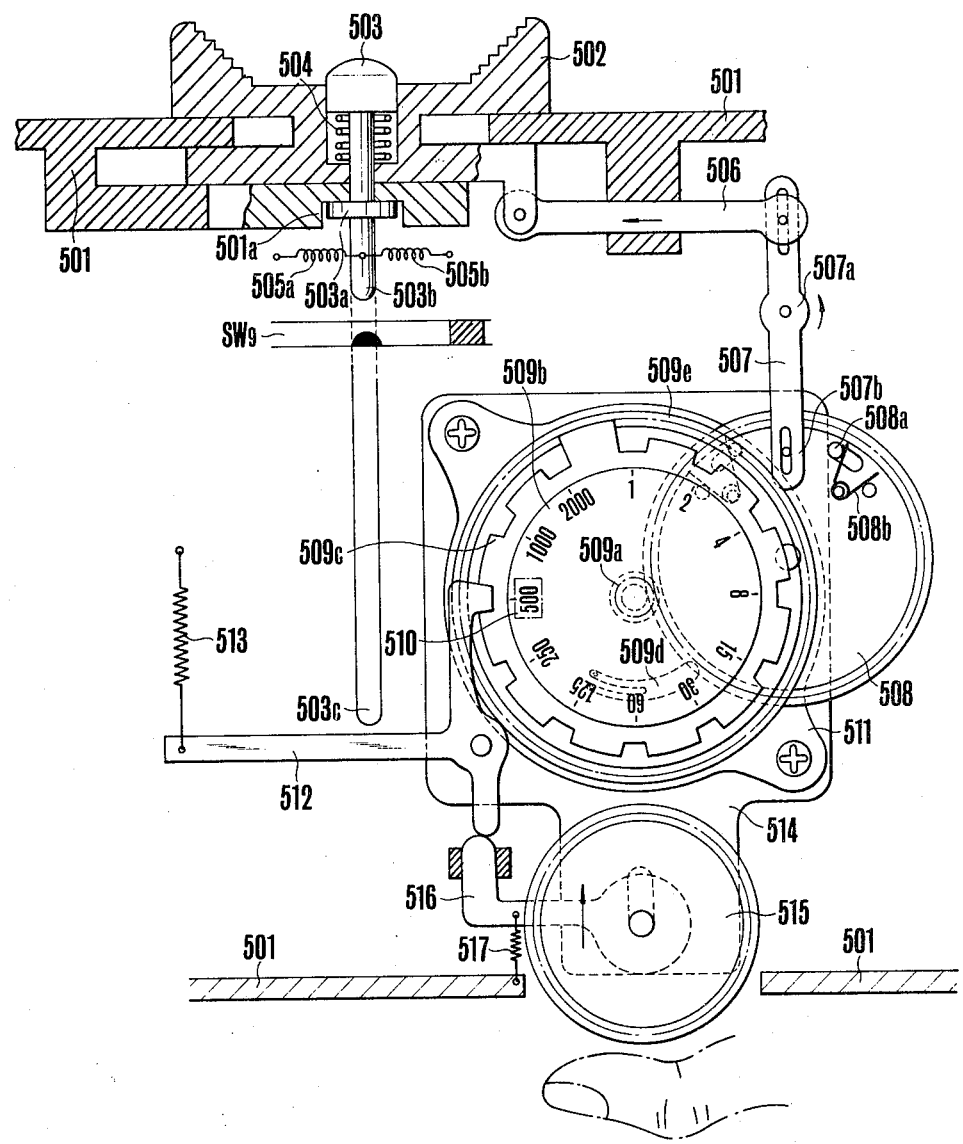
FIG. 14 is a partly elevational partly sectional view of another example of the essential parts of the camera shown in FIGS. 1 to 4.

Though the embodiment of the present invention shown in FIGS. 1, 2, 3 and 4 employs an electric motor to accomplish the shutter time shift, it is possible to use a mechanical drive as shown in FIG. 14 instead of the motor drive. In FIG. 14, for example, an external casing 501 for the camera is provided. A shift knob 502 is slidable to either of the right and left by depressing a lock button 503 to disengage a member 503a from a portion 501a of the external casing 501. At the same time, the end 503b of the lock button 503 closes the auxiliary electrical power switch SW9. Further, the extreme end 503c of the button 503 bears against a ratchet pawl 512 to release a ratchet 509c.

A return spring 504 is provided on lock button 503. After the shift operation is terminated, the shift knob 502 may be returned while the lock button 503 also returns under the action of this spring. Return springs 505a and 505b bring the shift knob to the central position after the termination of the operation. An intermediate lever 506 that engages the camera casing 501 is rotatably connected to the shift knob 502 for transmitting the motion of the shift knob 502 to a link lever 507. This link lever 507 has an elongated slot through which it is slidably connected to the intermediate lever 506 and is pivoted about a shaft 507a to transmit the motion of the shift knob 502 to a gear 508. The gear 508 receives the motion of the link lever 507 through a pin, and the rotation of the gear 508 is transmitted to a shutter dial 509b. The pin 508a movably mounted on the gear 508. A spring 508b is made stronger in comparison with the springs 505a and 505b in order to biases the pin 508a in one direction. Accordingly, when the shift knob 502 is vigorously operated, its mechanism is protected. The pin 508a and the spring 508b are arranged on the right and left positions of the link lever 507. The pin 508a is engaged with the link lever 507 at a portion 507b to convert the sliding movement of the shift knob 502 into to a rotational movement. A speed increasing gear 509a engages with the gear 508 and the shutter dial 509b has shutter time graduations and rotations in unison with the gear 509a.

The ratchet 509c fixes the position of an indicating plate 509b after the shift operation terminates. An electrical contact 509d that is slidable on a resistance body of an information input resistor also is provided; a gear 509e that responds to the rotation of a gear 515 rotates the shutter dial 509b. These parts 509a to 509e are assembled as a unit and are supported on a ground plate 514. A window 510 in the camera casing is adapted to display a character on the shutter dial 509b. An information input resistor 511 introduces shutter time information into the circuit, the back of which (though not shown in the drawing) is provided with a similar resistor 511'. This resistance body is provided on a substrate that is arranged on the ground plate 514.

The ratchet pawl 5/2, upon engagement with a ratchet 509c stops the rotation of the parts 509a to 509d. This ratchet pawl 512 is pivotally supported on the ground plate 514 and, as mentioned above, is arranged to be disengaged from the ratchet 509c when the extreme end 503c of the lock button 503 is engaged with the ratchet pawl 512. A spring 513 is arranged on one end of the ratchet pawl 512 to urge the pawled portion to engage the teeth of the ratchet 509c. The ground plate 514 supports the above mentioned members and their respective shafts.

The gear 515 may be pushed in a direction indicated by an arrow on the drawing when it is desired to move the shutter dial with the electrical power source cut off from the circuit. As shown in FIG. 14, the gear 515 is brought into engagement with the gear 509e. A lever 516 that is slidable in with the gear 515 takes the ratchet pawl 512 out of engagement with the ratchet 509c. Further, a spring 517 releases the gear 515 from engagement with the gear 509e when the finger for the purpose of this operation is removed. In these circumstances the gear 515 is restored along with the lever 516.

The operation of the camera having the mechanism described above with reference to FIG. 14 is explained below, while the circuitry of this embodiment of the invention being equivalent to that which would result from the omission of the shutter time adjusting circuit Z from the diagram shown in FIG. 4 and the resistors 511 and 511' of FIG. 14 being assumed to be equal to the resistors RTv1 and RTv2 of FIG. 4.

When exposure information (in this embodiment, the shutter time) is shifted, the lock button 503 is depressed to enable the end 503b to activate the switch SW9 and to cause the extreme end 503c to disengage the ratchet pawl 512 from the ratchet 509c and free shutter dial 509b. Further, the portion 503a clears the portion 501a of the camera casing to enable the shift knob 502 to move either to the right or to the left. For example, when it is desired to increase the shutter speed from 1/500 as shown in the drawing to 1/2000, the shift knob 502 must be moved to the left, to cause the intermediate lever 506 also to move to the left and turn the link lever 507 in a counter-clockwise direction.

The link lever 507 is turned to a position for a shutter speed of 1/500 at which it engages with pin 508a and then turns the gear 508. The rotation of the gear 508 is transmitted to the gear 509a to turn the shutter dial 509b with simultaneous sliding movement of the slider contact 509d on the information input resistor 511. After this shift is complete and finger is removed from the shift knob 502 and lock button 503, the shift knob 502 is returned to the central position by the return springs 505a and 505b and then the lock button 503 is returned by the return spring 504. This return causes the portion 501a and the member 503a to engage each other and lock the shift knob 502. The switch SW9 is opened to cutt off the power supply. 503c is moved away from the ratchet pawl 512, and the ratchet pawl 512 flies into the ratchet 509c under the action of the spring 513 so that the shutter dial 509b is fixed.

In the electrical power off state, when the shutter dial only is turned, the gear 515 is pushed by a finger in the directon of the arrow against the spring 517 from the camera casing 501, the gear 515 is engaged with the gear 509e. At this time the ratchet pawl 512 is disengaged from the ratchet 509c in order to free the shutter dial 509b. In this state, when the finger is moved to either right or left, the shutter dial 509b is moved to a desired position. After the desired position is attained, the finger may be removed to disengage the gear 515 from the gear 509e and the ratchet pawl 512 flies into the ratchet under the action of the spring 513, fixing the position of the shutter dial 509b.

Figure 15:
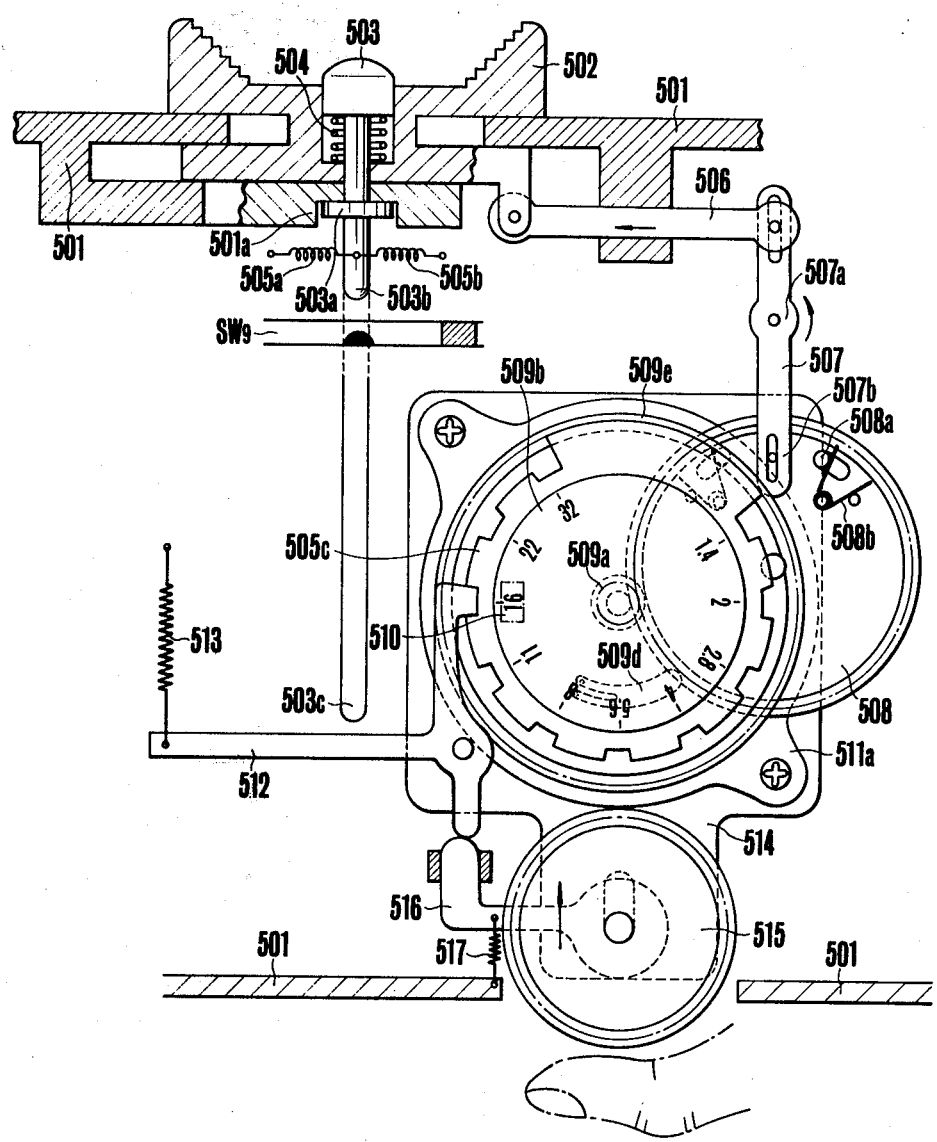
FIG. 15 is a partly elevational partly sectional view of another example of the essential parts of the camera that is shown in FIGS. 11 to 13.

Though the embodiment of the present invention shown in FIGS. 11, 12 and 13 drives the diaphragm shift function through an electric motor, this motor drive also may be replaced by a mechanical drive as shown in FIG. 15. The construction of this mechanical drive is almost identical with that which is shown in FIG. 5. The shutter dial 509b of FIG. 14, however, is replaced by a diaphragm scale dial 509b—, and 511a is a diaphragm information input resistor. The circuit for this case is an electrical circuit that results from eliminating the diaphragm value adjusting circuit Z' from the circuit of FIG. 13, and the resistor 511a is assumed to be equal to the resistor RAv1. The operation of the resulting structure of FIG. 15 is similar to that of FIG. 14, and therefore its explanation is omitted.

As mentioned above, in the exposure adjusting device of the present invention the shift operation for the priority information that is to be set to a desired value is performed by the shift mechanism instead of the shutter time or diaphragm preset by the shutter time dial and diaphragm ring arrangement that characterizes the conventional camera and lens. Because it is possible to set desired exposure conditions while monitoring the display of the shutter time and diaphragm values displayed in the finder, devices that embody the invention, when applied to any one of the two types of automatic exposure cameras for shutter priority and diaphragm priority makes the resultant apparatus very convenient, and its effect is very great.

What is claimed is:

1. An exposure adjusting device for a camera comprising:
   light measuring means for forming an electrical signal corresponding to the brightness of an object to be photographed;
   photographic information setting means for setting a photographic value and having adjustable signal forming means for producing an electrical signal corresponding to a set photographic value;
   exposure computing means for responding to an electrical signal produced by said light measuring means and an electrical signal produced by said photographic information setting means and for producing an electrical signal corresponding to a computed value;

first exposure control means responsive to the computing means for performing an exposure control operation in accordance with the computed value obtained from said exposure computing means;

second exposure control means for performing an exposure control operation in accordance with the electrical signal produced by said photographic information setting means;

first display means for displaying the set value of the photographic information setting means;

second display means for displaying the computed value obtained by computation performed by said exposure computing means;

driving means for driving and adjusting said signal forming means;

driving control means for controlling said driving means;

first switch means shiftable between an operating position in which the first switch means renders said driving control means operative and a non-operating position in which the first switch means renders said driving control means inoperative;

operation means manually shiftable between a setting position and a non-setting position, said operation means being arranged to place said first switch means in the operation position when the operation means is shifted into the setting position and to place said first switch means in the non-operating position when the operation means is shifted into the non-setting position;

starting means for starting said first and second exposure control means;

electromagnetic release means for actuating said starting means;

second switch means for actuating said electromagnetic release means in association with a release operation of the camera; and third switch means for connecting the camera with a supply of electric power.

2. The device according to claim 1, further comprising: a motor drive device attached to the camera, said motor drive device having three switches respectively corresponding to said first, second and third switch means, and said three switches being connected in parallel to the first, second and third switch means.

3. A camera provided with the motor drive device according to claim 2 further including: a remote control device having three additional switches corresponding to said first, second and third switch means, said remote control device being provided with a monitor device so that it is possible to operate these additional three switches while engaging in the monitor.

4. The device according to claim 1, in which said operating means has lock means for performing lock of operation of said operating means and said third switch means is rendered effective in response to the lock release of said lock means.

5. The device according to claim 4, further comprising: fourth switch means connected in parallel to said third switch means for likewise electrical current supply, said fourth switch means being actuated at the start of release operation of the camera.

6. The device according to claim 1, further comprising: warning means for providing a display when the computed value of said exposure computing means is out of an exposure responsive range; said means having a first display section for displaying the fact that the out-of-range is resulted on the overexposure side and a second display for displaying the fact that the out-of-range is resulted on the under exposure side.

7. An exposure adjusting device for a camera comprising:

light measuring means for producing an electrical signal corresponding to the brightness of an object to be photographed;

photographic information setting means having adjustable signal forming means for producing an electrical signal corresponding to a set photographic value;

exposure computing means for computing a value based on an electrical signal produced by said light measuring means and an electrical signal produced by said photographic information setting means, said computing means being arranged to produce an electrical signal corresponding to a computed value obtained as a result of computation;

first exposure control means for controlling an exposure on the basis of the computed value obtained from said exposure computing means;

second exposure control means for controlling an exposure on the bases of the electrical signal produced by said photographic information setting means;

first display means for displaying the set value of said photographic information setting means;

second display means for displaying the computed value obtained from said exposure computing means;

warning means for displaying a warning when the computed value of said exposure computing means deviates from a given range for an exposure operation, said warning means having a first display portion which displays that said computed value exceeds the range on the over-exposure side and a second display portion which displays that said computed value exceeds the range on the under-exposure side;

driving means for driving said signal forming means to adjust it;

driving control means for controlling said driving means in one or the other direction;

switch means for actuating said driving control means, said switch means being a selection switch shiftable between a first position and a second position, said switch means being arranged to actuate said driving control means to cause said driving means to drive in one direction when the selection switch is in the first position and to actuate said driving control means to cause said driving means to drive in the other direction when the selection switch is shifted to the second position; and operation means manually shiftable from a non-setting position either in the first or second setting position, said operation means being arranged to shift said selection switch to the first position thereof when the operation means is shifted to the first setting position and to shift said selection switch to the second position thereof when the operation means is shifted to the second setting position for shifting said selection switch to one of the first and second positions thereof until display by said warning means disappears when either the first or second display portion of said warning means displays a warning.

8. An exposure adjusting device for a camera comprising:
    light measuring means for producing an electrical signal corresponding to the brightness of an object to be photographed;
    photographic information setting means for producing an electrical signal corresponding to a set value of photographic information;
    exposure computing means for computing a value, and producing a signal corresponding to the value; based on an electrical signal produced by said light measuring means and an electrical signal produced by said photographic information setting means;
    first exposure control means for controlling an exposure on the basis of the electrical signal produced by said exposure computing means;
    second exposure control means for controlling an exposure on the basis of the signal produced by said photographic information setting means;
    first display means for displaying photographic information in accordance with the signal produced by said photographic information setting means;
    second display means for displaying an exposure value in accordance with the signal produced by said exposure computing means;
    driving means for automatically shifting the value set by said photographic information setting means;
    driving control means for controlling the driving operation of said driving means, said driving control means having switch means shiftable between a driving position in which said driving control means renders said driving means operative and a non-driving position in which said driving control means renders said driving means inoperative; and
    operation means manually shiftable between a setting position and a non-setting position for placing said switch means in said driving position when the operation means is shifted into said setting position and placing said switch means in said non-driving position when the operation means is shifted into said non-setting position.

9. An exposure adjusting device according to claim 8, wherein said switch means is a selector switch which is shiftable from said non-driving position either to a first driving position or a second driving position; and wherein said operation means is arranged to be shiftable from said non-setting position either to a first setting position or to a second setting position.

10. An exposure adjusting device according to claim 9, wherein said driving control means is arranged to drive said driving means in one directon when said selector switch is shifted to the first driving position and to drive said driving means in the opposite direction when said selector switch is shifted to the second driving position.

11. The device according to claim 10, in which said drive means is a motor.

12. The device according to claim 10, further comprising: an accessory device mountable to the camera, said accessory device having a second selector switch connected in parallel to said first selector switch and another operating means for operating said second selector switch.

* * * * *